(12) United States Patent
Varrelmann

(10) Patent No.: US 11,565,831 B2
(45) Date of Patent: Jan. 31, 2023

(54) MACHINING SYSTEM FOR AIRCRAFT STRUCTURAL COMPONENTS

(71) Applicant: Broetje-Automation GmbH, Rastede (DE)

(72) Inventor: Nils Varrelmann, Varel (DE)

(73) Assignee: Broetje-Automation GmbH, Rastede (DE)

( * ) Notice: Subject to any disclaimer, the term of this patent is extended or adjusted under 35 U.S.C. 154(b) by 0 days.

(21) Appl. No.: 16/633,917

(22) PCT Filed: Apr. 27, 2018

(86) PCT No.: PCT/EP2018/060901
§ 371 (c)(1),
(2) Date: Jan. 24, 2020

(87) PCT Pub. No.: WO2019/020228
PCT Pub. Date: Jan. 31, 2019

(65) Prior Publication Data
US 2021/0086914 A1    Mar. 25, 2021

(30) Foreign Application Priority Data

Jul. 24, 2017 (DE) ...................... 10 2017 116 719.6

(51) Int. Cl.
*B21J 15/14* (2006.01)
*B64F 5/10* (2017.01)
(Continued)

(52) U.S. Cl.
CPC ................. *B64F 5/10* (2017.01); *B21J 13/08* (2013.01); *B21J 15/10* (2013.01); *B21J 15/142* (2013.01);
(Continued)

(58) Field of Classification Search
CPC .. B64F 5/10; B21J 15/142; B21J 15/42; B21J 13/08; B21J 15/10; B21J 15/365;
(Continued)

(56) References Cited

U.S. PATENT DOCUMENTS 2,638,662 A * 5/1953 Rothwell ............. B21D 28/265
29/34 D
3,154,979 A 11/1964 Crispin et al.
(Continued)

FOREIGN PATENT DOCUMENTS

CN     101817146    9/2010
DE     102013004598 9/2014
(Continued)

OTHER PUBLICATIONS

"Broetje-Automation IPAC," Broetje-Automation GmbH YouTube video published Jul. 16, 2012 and accessed Jun. 28, 2018 from URL <https://www.youtube.com/watch?v=Q2cQn0JFsLI>.
(Continued)

*Primary Examiner* — Mahdi H Nejad
(74) *Attorney, Agent, or Firm* — Pauly, DeVries Smith & Deffner LLC

(57) ABSTRACT

The disclosure relates to a processing installation for aircraft structural components having a processing station comprising a clamping frame for receiving the structural component, wherein the clamping frame extends along a station longitudinal axis which extends in a longitudinal direction and a processing unit which has an upper tool unit having an upper tool and a lower tool unit, wherein the processing installation has a processing region which is formed by a laterally delimited, first spatial portion in which the clamping frame and the processing unit are arranged during processing, wherein the processing installation has a service region for carrying out service operations, wherein the first spatial
(Continued)

portion is separated from the second spatial portion in a transverse direction, wherein a service platform is arranged in the service region and can be positioned in a service plane which is orthogonal to the vertical direction.

20 Claims, 3 Drawing Sheets

(51) Int. Cl.
*B21J 13/08* (2006.01)
*B21J 15/42* (2006.01)
*B23Q 1/48* (2006.01)
*B23Q 3/157* (2006.01)
*B23Q 1/25* (2006.01)
*B21J 15/10* (2006.01)
*B23Q 41/04* (2006.01)
*B21J 15/36* (2006.01)
*B25J 5/04* (2006.01)

(52) U.S. Cl.
CPC ............ *B21J 15/42* (2013.01); *B23Q 1/25* (2013.01); *B23Q 1/4804* (2013.01); *B23Q 3/157* (2013.01); *B23Q 41/04* (2013.01); *B21J 15/365* (2013.01); *B25J 5/04* (2013.01)

(58) Field of Classification Search
CPC ........ B23Q 1/4804; B23Q 1/525; B23Q 1/25; B23Q 3/157; B23Q 41/04; B23P 2700/01; B25J 5/04; B66F 11/04
See application file for complete search history.

(56) References Cited

U.S. PATENT DOCUMENTS

| | | | | |
|---|---|---|---|---|
| 3,534,896 A | * | 10/1970 | Krynytzky | ............... B21J 15/14 227/51 |
| 4,759,109 A | | 7/1988 | Mason et al. | |
| 4,864,702 A | | 9/1989 | Speller, Sr. et al. | |
| 4,885,836 A | * | 12/1989 | Bonomi | .................... B21J 15/10 29/524.1 |
| 4,967,947 A | * | 11/1990 | Sarh | .......................... B23Q 1/01 227/51 |
| 5,163,793 A | * | 11/1992 | Martinez | ................... B21J 15/10 269/309 |
| 5,778,505 A | * | 7/1998 | Mangus | .................... B21J 15/10 227/51 |
| 5,896,637 A | | 4/1999 | Sarh | |
| 6,029,352 A | | 2/2000 | Nelson | |
| 6,092,275 A | | 7/2000 | Kellner et al. | |
| 6,098,260 A | * | 8/2000 | Sarh | .......................... B21J 15/10 227/52 |
| 6,223,413 B1 | | 5/2001 | Crocker et al. | |
| 6,505,393 B2 | | 1/2003 | Stoewer et al. | |
| 8,657,274 B2 | | 2/2014 | Hazlehurst et al. | |
| 2007/0004278 A1 | | 1/2007 | Wesseloh | |
| 2010/0011563 A1 | | 1/2010 | Burns et al. | |
| 2013/0019446 A1 | * | 1/2013 | Venskus | ................. B21J 15/142 29/407.09 |
| 2013/0336737 A1 | * | 12/2013 | Fujita | .................... B23B 39/168 408/87 |
| 2020/0231305 A1 | * | 7/2020 | Varrelmann | ........... B21J 15/142 29/407.09 |

FOREIGN PATENT DOCUMENTS

| | | |
|---|---|---|
| DE | 102014113663 | 3/2016 |
| EP | 1110680 | 6/2001 |
| SU | 603479 | 4/1978 |
| SU | 1103979 | 7/1984 |
| WO | 2019020228 | 1/2019 |

OTHER PUBLICATIONS

"International Search Report and Written Opinion," for PCT Application No. PCT/EP2018/060901 (corresponding to our file 218.0201USWO) dated Jul. 20, 2018 (16 pages).

* cited by examiner

MACHINING SYSTEM FOR AIRCRAFT STRUCTURAL COMPONENTS

CROSS-REFERENCE TO RELATED APPLICATIONS

This application is a national stage application under 35 U.S.C. 371 of International Patent Application Serial No. PCT/EP2018/060901, entitled "Machining System For Aircraft Structural Components," filed Apr. 27, 2018, which claims priority from German Patent Application No. DE 10 2017 116 719.6, filed Jul. 24, 2017, the disclosure of which is incorporated herein by reference.

FIELD OF THE TECHNOLOGY

The disclosure relates to a processing installation for aircraft structural components and a method for processing an aircraft structural component having a processing installation.

BACKGROUND

The production of missiles and in particular aircraft involves processing large aircraft structural components, such as, for example, the wings and the fuselage or portions thereof in special processing installations. The known processing installation (U.S. Pat. No. 5,778,505), on which the disclosure is based, has a processing station with a clamping frame for receiving the aircraft structural component which is intended to be processed in each case. The processing station is further provided with a processing unit in the form of a riveting unit, which has an upper tool unit having an upper tool and an associated lower tool unit having a lower tool, wherein, with a coaxial orientation of the tool axis of the upper tool relative to the tool axis of the lower tool, a riveting operation can be carried out on the aircraft structural component.

In the known processing installation, a processing region and a service region are provided. The processing region is a spatial portion of the processing installation in which the correct processing of the aircraft structural component which is arranged on the clamping frame is carried out with the upper tool and lower tool. The service region is a spatial portion of the processing installation in which service operations, for example, maintenance and repair operations or a tool change, can be carried out. To this end, the known processing installation has a service platform which is arranged in a fixed service plane and which can be accessed by service operators. However, the service operators cannot reach all the tools via the service platform of the known processing installation. Thus, only the lower tool unit, that is to say, lower tool and lower tool carrier, is accessible from the service platform in this case. For service operations on the upper tool unit, that is to say, on the upper tool and upper tool carrier, the service operators have to provide an additional service platform because the upper tool unit is inaccessible from the service platform which is arranged in the service region. The additional service platform then has to project at least partially into the processing region in order to reach the upper tool. Service operations are therefore relatively complex and time-intensive.

SUMMARY

The problem addressed by the disclosure is to configure and develop the known processing installation in such a manner that service operations can be carried out more simply.

The above problem is solved with a processing installation as described herein.

A significant aspect is the basic consideration to support the upper tool and the lower tool in such a displaceable, in particular linearly displaceable, manner that both tools are accessible from a common service platform. In this case, the service platform is arranged in a fixed service plane, from which both tools can be reached. The service platform therefore does not have to be displaced in order to be able to carry out, after service operations on one of the tools, service operations on the other one of the tools. In this case, it is not excluded for the service platform also to be able to be displaced, in particular to be able to be moved away from the remaining processing installation or the processing region if no service operations are being carried out. When the service operations are being carried out, however, the service platform is arranged in said fixed service plane, from which both the upper tool and the lower tool and in particular also the associated tool carrier are accessible.

The term "accessible" or "reachable" is intended to be understood to mean that the respective upper tool or lower tool is within reach of the service operator or a service device such as an automatic tool changer.

By the upper tool and lower tool both being accessible from the same service platform if it is positioned in the predetermined service plane, service operations can be carried out substantially more simply and quickly than in the prior art. An additional advantage is that in the processing installation as proposed the processing region is completely separated from the service region, that is to say, the service operations are carried out in a region or from a region which is outside the processing region. In this manner, on the one hand, no reconstruction operations are necessary in the processing region and there is also no risk that tool portions or installation portions are inadvertently left behind in the processing region after the service operations.

Various embodiments define that the upper tool and/or the lower tool is/are able to be positioned either in the processing region or in the service region in a configuration in the service position thereof. The service position therefore does not necessarily have to be located within the service region, but instead in particular adjoins it.

Various embodiments define possible arrangements of the upper tool in the service position thereof.

Various embodiments define possible arrangements of the lower tool in the service position thereof.

In various embodiments, there is provided an automatic tool changer which can be displaced between a park position and a change position. The automatic tool changer is positioned in the park position thereof in particular within the service region and/or in the change position thereof outside the service region, such as above the lower tool carrier.

Various embodiments relate to the arrangement of a test portion holder in relation to the respective service position of the upper tool and/or lower tool. Such a test portion holder is used to fix a test portion, on which the function of the upper tool and/or lower tool can be tested.

Various embodiments define a frame, on which the upper tool or the associated upper tool carrier and/or the lower tool or the associated lower tool carrier can be supported. The frame may be constructed in a C-shaped manner or in the manner of a portal and delimits the processing region at least at one side, that is to say, in a transverse direction. The processing region therefore terminates at the inner side of said lateral frame portion. In various embodiments, the service region adjoins this location, that is to say, the lateral frame portion is then located in the service region. In various embodiments, this lateral frame portion is provided with an opening which is directed in the transverse direction and through which the respective tool, at least the upper tool, can be displaced from the processing region into the service region and/or through which the service operators from the service region can reach the tool which is arranged in the respective service position.

Such a frame enables a suitable operating height for processing various aircraft structural components, for example, fuselages or wings. The operating height, that is to say, the location at which the upper tool cooperates correctly with the lower tool, is in particular in a range from 5 m to 7 m, such as in a range from 5.5 m to 6.5 m, and in some embodiments in a range from 5.5 m to 6 m.

According to another embodiment, a method for processing an aircraft structural component having a processing installation is provided.

In some embodiments, for maintenance operations, repair operations or a tool change, the upper tool and the lower tool are accessible from a common service platform. In this manner, service operations are simplified and shortened because for operations both on the upper tool and on the lower tool only a single service platform still has to be positioned in a single service plane. Furthermore, with regard to the method reference may be made to the preceding explanations in relation to the processing installation.

Various embodiments provide a processing installation for aircraft structural components having a processing station comprising a clamping frame for receiving the aircraft structural component which is intended to be processed in each case, wherein the clamping frame extends along a station longitudinal axis which extends in a longitudinal direction and a processing unit for processing the aircraft structural component which has an upper tool unit having an upper tool which is orientated along a first tool axis and a lower tool unit having a lower tool which is orientated along a second tool axis, wherein the first tool axis and the second tool axis extend parallel with a vertical direction which is angled relative to the longitudinal direction, in particular orthogonal, wherein the processing installation has a processing region for processing the aircraft structural component which is formed by a laterally delimited, first spatial portion in which the clamping frame and the processing unit are arranged during processing, wherein the processing installation has a service region for carrying out service operations, which is formed by a laterally delimited, second spatial portion, wherein the first spatial portion is separated from the second spatial portion in a transverse direction which is orthogonal to the longitudinal direction and vertical direction, wherein a service platform is arranged in the service region and is or can be positioned in a service plane which is orthogonal to the vertical direction, wherein the upper tool and the lower tool are displaceable into at least one service position, wherein both tools are accessible from the common service platform which is positioned in the service plane in the service positions.

In various embodiments, the upper tool and/or the lower tool is/are positioned in the service position or in at least one of the service positions in the processing region, in particular in a position adjacent to the service region, and/or in the service region.

In various embodiments, the upper tool in the service position or in at least one of the service positions in the service region, in particular in a vertical direction above the service platform, and/or in the transverse direction is positioned adjacent to the service region and/or the service platform, in particular in a plane which is orthogonal to the vertical direction and which is spaced apart from the service platform.

In various embodiments, the spacing between the upper tool and the service plane is in a range from 0.5 m to 2.0 m, in a range from 1.0 m to 1.8 m, or in a range from 1.2 m to 1.6 m.

In various embodiments, the lower tool in the service position or in at least one of the service positions in the transverse direction is positioned adjacent to the service region and/or the service platform and/or in the service region, in particular in the vertical direction above the service platform.

In various embodiments, the lower tool, in particular on a lower tool carrier, is displaceable between different service positions along the service region and/or along the service platform, in particular in the longitudinal direction, such as wherein the lower tool carrier is rotatable and/or linearly displaceable relative to the service region, in particular the service platform.

In various embodiments, the lower tool in the service position or in at least one of the service positions in the transverse direction is positioned adjacent to an automatic tool changer, such as wherein the automatic tool changer is positioned in a park position of the automatic tool changer in the service region, in particular in a vertical direction above the service platform, and/or is positioned in a change position of the automatic tool changer in the transverse direction adjacent to the service region and/or in a vertical direction above the lower tool carrier.

In various embodiments, the upper tool in the service position or in at least one of the service positions in the vertical direction is positioned above a test portion holder.

In various embodiments, the lower tool in the service position or in at least one of the service positions in the vertical direction is positioned below a test portion holder.

In various embodiments, the test portion holder in the transverse direction is positioned adjacent to the service region and/or the service platform.

In various embodiments, the processing installation has a frame, on which the upper tool, in particular via an upper tool carrier, and, in some embodiments, the lower tool, in particular via the lower tool carrier, is supported, wherein the upper tool and/or the lower tool can each be displaced relative to the frame between at least one processing position and at least one service position.

In various embodiments, the frame has at least one lateral frame portion, in particular two lateral frame portions which are spaced apart from each other in the transverse direction, wherein the first spatial portion which forms the processing region is laterally delimited by the at least one lateral frame portion, wherein the at least one lateral frame portion is connected to an upper frame portion for supporting the upper tool, in particular upper tool carrier, and/or a lower frame portion for supporting the lower tool, in particular lower tool carrier, wherein the lower frame portion, the at least one lateral frame portion and the upper frame portion together form a C-shape or portal-like shape.

In various embodiments, the service platform is arranged at or adjacent to the lateral frame portion or one of the lateral frame portions, wherein the upper tool and/or the lower tool is/are accessible past the lateral frame portion or through an opening which is directed in a traverse direction in the lateral frame portion in the respective service position from the service platform, or is/are displaceable between the processing region and the service region.

In various embodiments, the service platform is permanently fixed on the frame, in particular on the lateral frame portion, in the longitudinal direction and/or transverse direction and/or vertical direction.

Various embodiments provide a method for processing an aircraft structural component having a processing installation as described herein, wherein for service purposes the upper tool and the lower tool are each displaced into the service position or into at least one service position in such a manner that the upper tool and the lower tool are accessible from the common service platform.

BRIEF DESCRIPTION OF THE DRAWINGS

Various aspects are explained in greater detail below with reference to the drawings which illustrate only one embodiment. In the drawings:

FIG. 3 is an enlarged view of a detail of the processing installation according to FIG. 2a.

DETAILED DESCRIPTION

Figure 1:
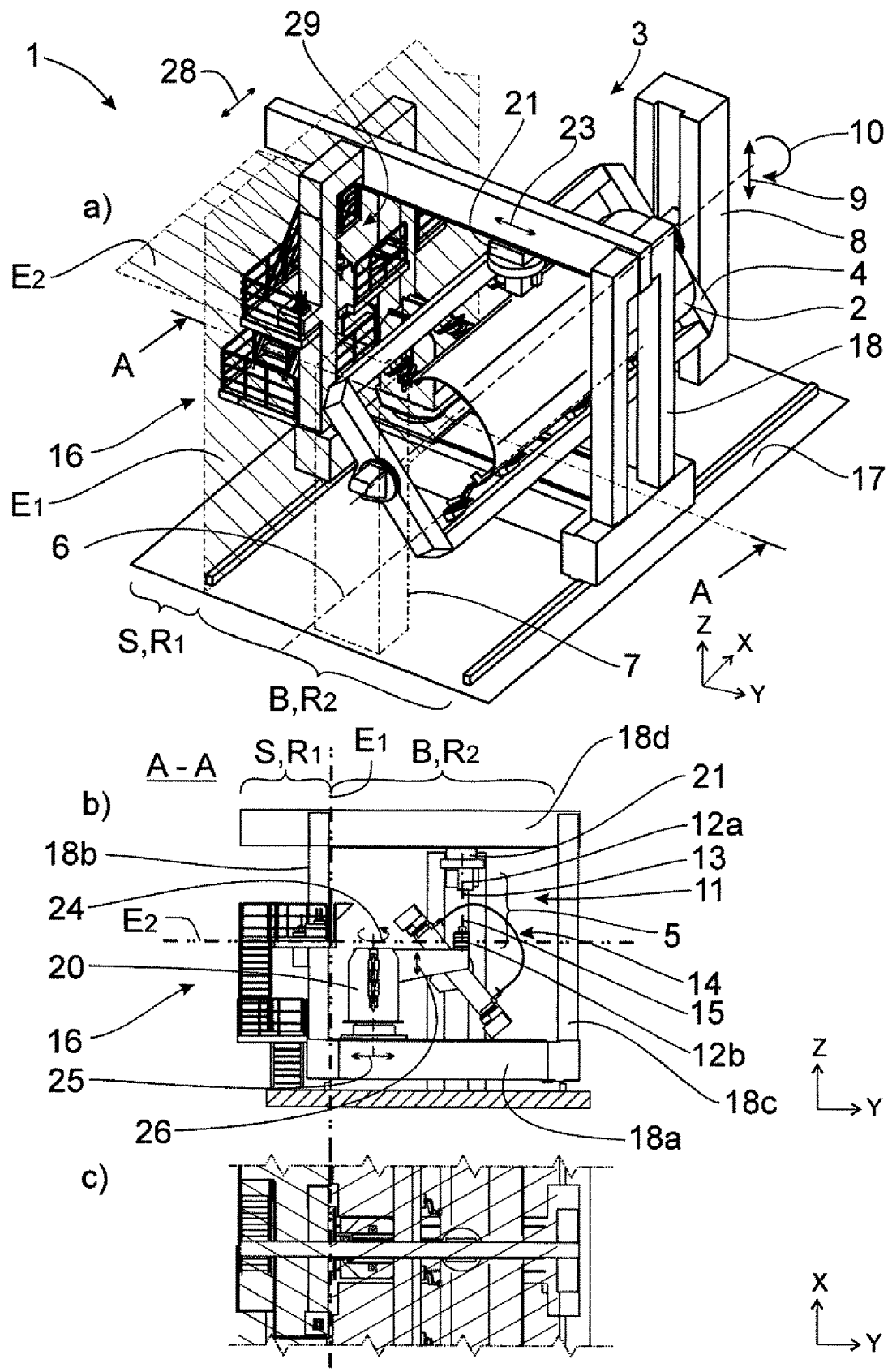
FIG. 1 shows a processing installation as proposed in a processing position a) as a perspective view, b) as a cross-section and c) as a cutout from above.

The illustrated processing installation 1 serves to process aircraft structural components 2 which, as mentioned above, may be fuselages, wings or other large aircraft structural components 2. The processing installation 1 has a processing station 3. The processing station 3 has, on the one hand, a clamping frame 4 for receiving the aircraft structural component 2 which is intended to be processed and, on the other hand, a processing unit 5 for processing the aircraft structural component 2.

The clamping frame 4 extends along a station longitudinal axis 6 which extends in a longitudinal direction X of the processing installation 1. The extent of the clamping frame 4 along the station longitudinal axis 6 is intended to be understood in broad terms. It means that the clamping frame 4 extends at least in a basic position parallel with the station longitudinal axis 6, for example, when the clamping frame 4 is orientated vertically and/or is orientated horizontally.

The clamping frame 4 is in this instance articulated to two positioning towers 7, 8 which extend parallel with the vertical direction Z so as to be adjustable in terms of height and pivotable. The height adjustability is designated 9 in FIG. 1a and the pivotability is designated 10. In this instance, the height adjustability 9 may be possible separately for both positioning towers 7, 8 so that a tilting of the clamping frame 4 about a tilting axis which extends transversely relative to the station longitudinal axis 6 (not illustrated in this instance) can be produced.

The processing unit 5 comprises an upper tool unit 11 having an upper tool 13 which is orientated along a first tool axis 12a and an associated lower tool unit 14 having a lower tool 15 which is orientated along a second tool axis 12b. The upper tool unit 11 and the lower tool unit 14 in each case form an end effector, wherein the upper tool 13 is in particular a rivet head or drill head and the lower tool 15 forms the corresponding counterpiece. In principle, the upper tool unit 11 may also have more than one upper tool 13, in particular an additional rivet head and/or drill head.

The processing installation 1 as proposed has a processing region B and a service region S which are indicated by curly brackets in FIGS. 1a and 1b and in FIGS. 2a and 2b and by different hatchings in FIG. 1c and in FIG. 2c. The processing region B is a region of the processing installation 1 in which the processing of the aircraft structural component 2 is carried out correctly. The processing region B is formed by a laterally delimited first spatial portion $R_1$, that is to say, a spatial portion which is delimited in the transverse direction Y. The clamping frame 4 is also located in this spatial portion $R_1$, which extends between the two positioning towers 7, 8 which are spaced apart from each other in the longitudinal direction X. The service region S which is used to carry out maintenance and repair operations and to change tools laterally adjoins the processing region B. The service region S is formed by a second spatial portion $R_2$ which is located outside the processing region B or first spatial portion $R_1$. The term "laterally" is intended to be understood to mean here "in the transverse direction Y", that is to say, the first spatial portion $R_1$ and the second spatial portion $R_2$ are located beside each other in the transverse direction Y. In this instance, the first spatial portion $R_1$ and the second spatial portion $R_2$ directly adjoin each other in a plane $E_1$ which extends in the longitudinal direction X and vertical direction Z.

Figure 2:
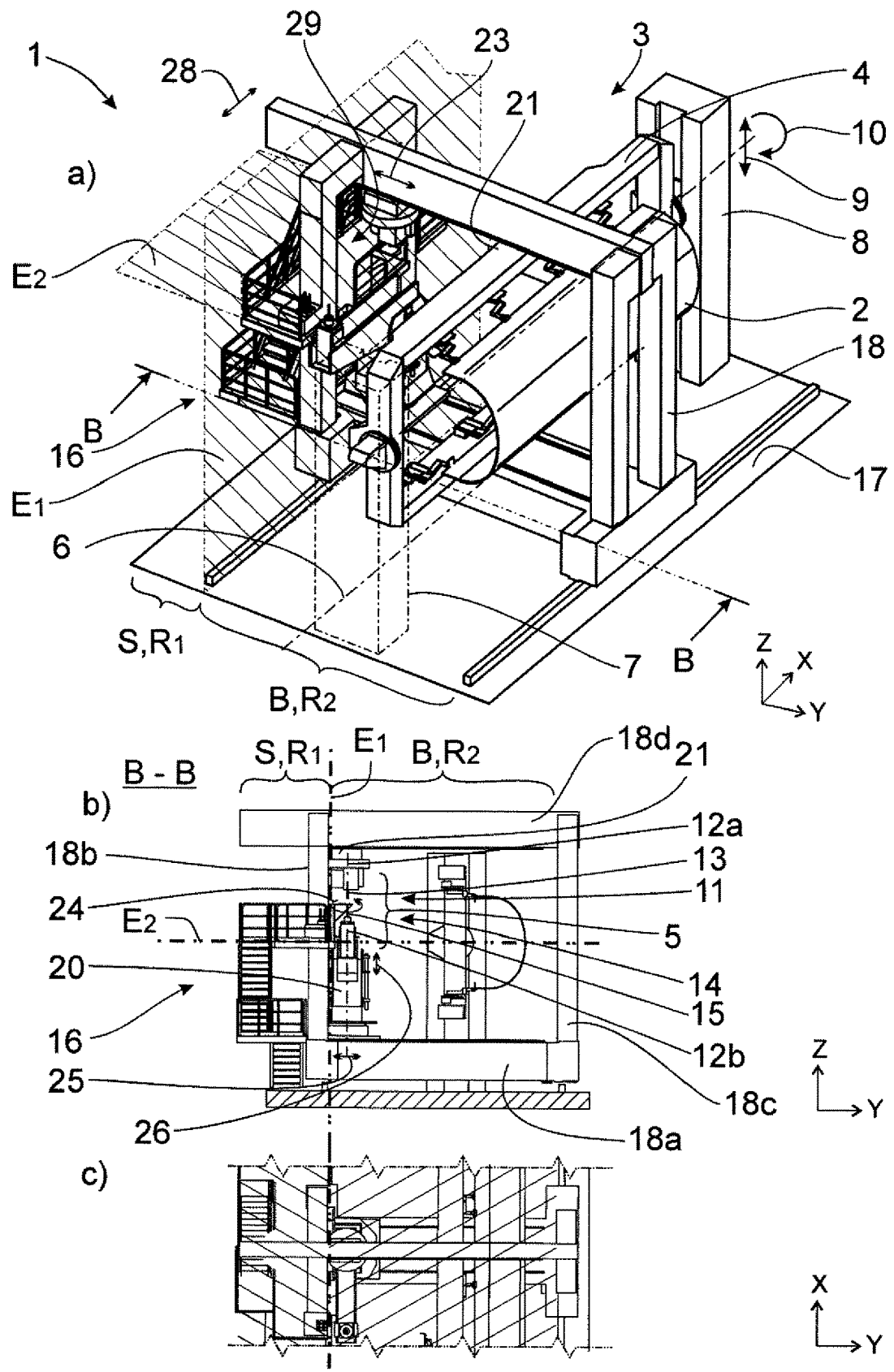
FIG. 2 shows the processing installation according to FIG. 1 in a service position a) as a perspective view, b) as a cross-section and c) as a cutout from above.
Figure 3:
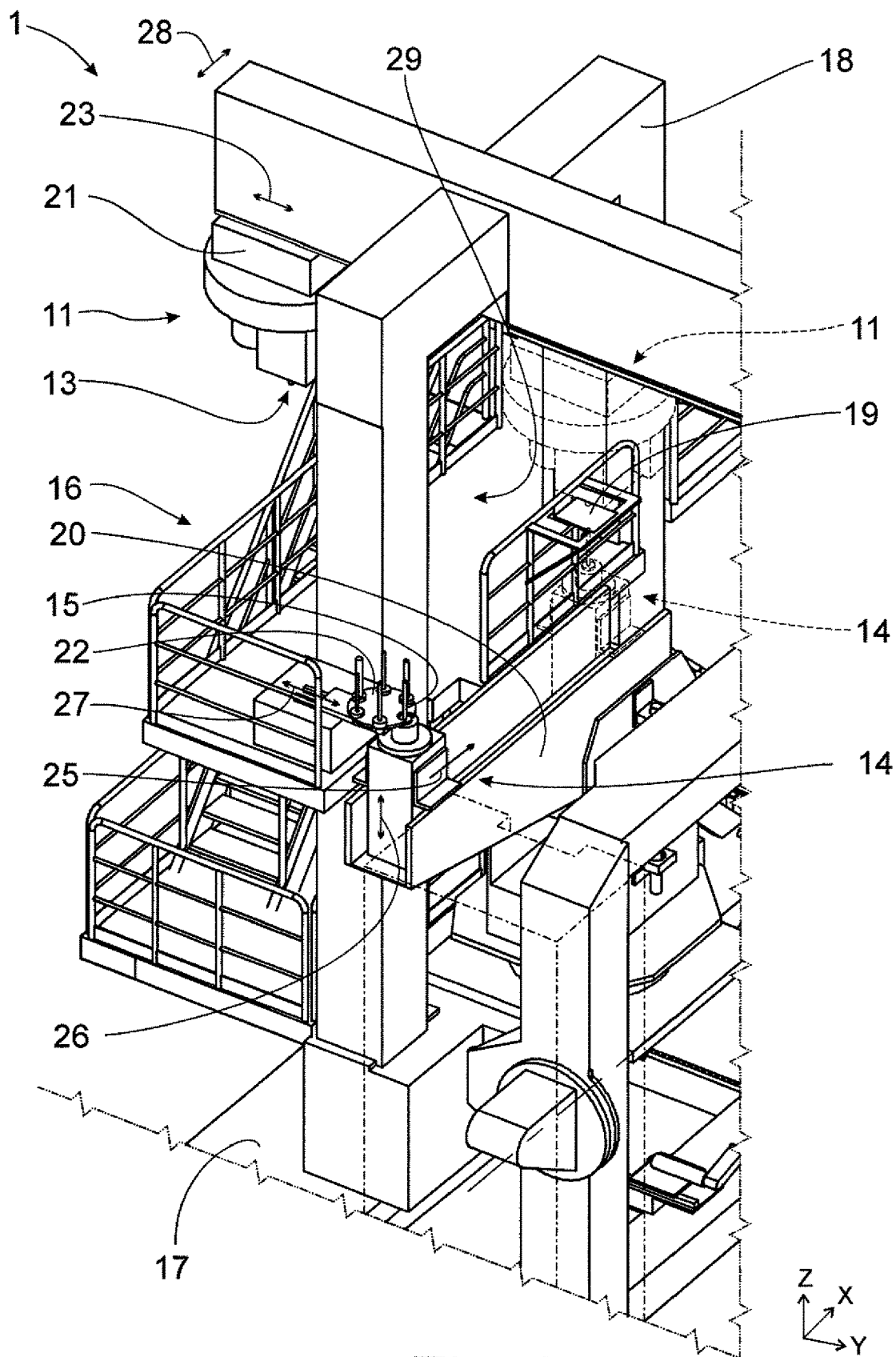

As can be seen in FIGS. 1 to 3, a service platform 16 which is located in the service region S laterally adjoins the processing region B. The service platform 16 is or can be positioned in a service plane $E_2$ which is orthogonal to the vertical direction Z. In this case, the service plane $E_2$ is a fixed plane $E_1$, therefore it has a defined and invariable spacing from the substrate 17 of the processing installation 1.

A significant aspect is that the upper tool 13 and the lower tool 15 can be displaced from any processing position, in which the upper tool 13 and the lower tool 15 carry out a processing of the aircraft structural component 2 (FIGS. 1a-c) into one or more service positions (FIGS. 2a-c and FIG. 3), wherein in the respective service position both the upper tool 13 and the lower tool 15 are accessible from the common service platform 16 which is positioned in the service plane $E_2$. With the processing installation 1 as proposed, consequently, there is provided a single region from which the service operations can be carried out both on the upper tool 13 or upper tool unit 11 and on the lower tool 15 or lower tool unit 14. The need to provide and to position additional service platforms or to displace a service platform to different locations is consequently dispensed with.

As FIGS. 1c and 2c show, the processing region B extends inside the frame 18 of the processing installation 1 which is configured here in a portal-like manner by way of example and which comprises a lower frame portion 18a, two lateral frame portions 18b, 18c and an upper frame portion 18d. In specific terms, the processing region B extends from the inner side (directed towards the clamping frame 4) of the left lateral frame portion 18b as far as the inner side (directed towards the clamping frame 4) of the right lateral frame portion 18c. The processing region B extends in the longitudinal direction X between the positioning towers 7, 8. The service region S extends relative to the longitudinal direction X parallel with the processing region and has in this instance the same extent in a longitudinal direction X. The service region S extends in the transverse direction Y from the inner side (directed towards the clamping frame 4) of the lateral frame portion 18b as far as the side (directed away from the clamping frame 4) of the service platform 16. The processing region B and the service region S extend in the vertical direction Z between a plane (not illustrated here), through which the upper side of the lower frame portion 18a extends, which upper side faces the clamping frame 4, and a plane (not illustrated here), through which the lower side of the upper frame portion 18d extends, which lower side faces the clamping frame 4.

The upper tool 13 and/or the lower tool 15 can now be displaced into one or more service positions, of which a number are illustrated in FIGS. 2a-c and 3. Thus, for example, the upper tool 13 can be displaced by means of an associated displaceable upper tool carrier 21 into a service position which is designated 23 and which is located in the vertical direction Z above the service platform 16 (illustrated with a solid line in FIGS. 2a-c and in FIG. 3). This service position is located within the service region S. In this instance, for example, maintenance and repair operations can be carried out by the service operators.

The upper tool 13 can also be displaced into an alternative service position which is also designated 23 and which is arranged in the transverse direction Y adjacent to the service region S and the service platform 16 and in which the upper tool 13 is located in a plane (not illustrated) which is spaced apart from the service plane $E_2$ in the vertical direction Z. The spacing between the upper tool 13 and the service plane $E_2$ is, particularly for all the above-described service positions of the upper tool 13, in a range from 0.5 m to 2.0 m, in a range from 1.0 m to 1.8 m, or in a range from 1.2 m to 1.6 m. In this service position (illustrated with broken lines in FIG. 3), the function of the upper tool 13 can be checked on a test portion holder 19 which is described in greater detail below.

In this instance, the lower tool 15 can be brought into different service positions which are arranged in the transverse direction Y adjacent to the service region S or the service platform 16. In principle, however, it is also conceivable to provide at least one service position of the lower tool 15 within the service region S (not illustrated here). The lower tool 15 is linearly displaceable here in particular on a lower tool carrier 20, in particular between a first service position (illustrated with solid lines in FIGS. 2a-c and in FIG. 3) and a second service position (illustrated with broken lines in FIG. 3).

In the first service position, the lower tool 15 cooperates in this instance with an automatic tool changer 22, which is described in greater detail below.

Alternatively, the lower tool can also be moved into a service position in the vertical direction Z under the test portion holder 19 in order to check the function of the lower tool 15. In the orientation of the lower tool carrier 20 illustrated in FIGS. 2a-c and in FIG. 3, the lower tool 15 can be displaced, here in the longitudinal direction X, along the service region S or the service platform 16. Since the lower tool carrier 20 is in this instance rotatable and/or linearly displaceable relative to the service region S or the service platform 16, however, it is also conceivable to displace the lower tool 15 on the lower tool carrier 20 in an angular manner relative to the longitudinal direction X and in particular in the transverse direction Y in order to arrange the lower tool 15 in one of the service positions thereof. In detail, the lower tool carrier 20 is in this instance rotatable about a rotation axis which extends parallel with the vertical direction Z (designated 24) and/or linearly displaceable in the transverse direction Y (designated 25) and/or adjustable in the vertical direction Z (designated 26).

As already mentioned and illustrated in detail in FIG. 3, the processing installation 1 as proposed has in this instance an automatic tool changer 22. In the processing position of the lower tool 15 illustrated with a solid line in FIG. 3, the lower tool 15 is located within the range of the automatic tool changer 22. In other words, the lower tool 15 is accessible here from the service region S for the automatic tool changer 22. In order to carry out a tool change, the automatic tool changer 22 can be displaced from a park position in the service region S, which is particularly located in the vertical direction Z above the service platform 16, in the transverse direction Y into a change position adjacent to the service region S and in particular in the vertical direction Z above the lower tool carrier 20 (designated 27 in FIG. 3). After a tool change has been carried out, the automatic tool changer 22 can be displaced again from the change position back into the park position (also designated 27 in FIG. 3).

Subsequently, the lower tool 15 can be displaced on the lower tool carrier 20 into the service position which is illustrated with broken lines in FIG. 3 and in which said test portion holder 19 is arranged. In order to carry out a function test on the upper tool 13 and/or lower tool 15, the upper tool 13 is arranged in the vertical direction Z above the test portion holder 19 and the lower tool 15 is arranged underneath and actuated correctly. The test portion holder 19 is in this instance arranged in the transverse direction Y adjacent to the service region S but can in principle also be arranged in the service region S. In particular, the test portion holder 19 is arranged in the vertical direction Z in a plane above the service plane $E_2$.

As already explained, the processing installation 1 as proposed has a frame 18 which is in this instance portal-like and which carries individual components, in particular the upper tool unit 11 and the lower tool unit 14, but in this instance also the service platform 16. The frame 18 is itself displaceable relative to the substrate 17, in this instance in the longitudinal direction X or along the station longitudinal axis 6. In this case, the service platform 16 is always also moved. It is securely connected in this case to the frame 18, in particular to the left lateral frame portion 18b.

The lateral frame portion 18b which is arranged here completely inside the service region S has an opening 29, through which, as can be seen in FIG. 3, the upper tool unit 11 or the upper tool 13 can be displaced into the service region S from the processing region B. The upper tool 13 and the lower tool 15 are also accessible to the service operators through this opening 29 if the upper tool 13 and the lower tool 15 are located in the position illustrated with broken lines in FIG. 3 in the region of the test portion holder 19.

The individual rotational movements and linear movements of the above-mentioned components of the processing installation 1 can be brought about via drive motors, in particular via drive motors which are independent of each other (not illustrated). The processing installation 1 as proposed may thus have one or more of the following drive motors:

- a drive motor for the rotational movement of the lower tool carrier 20, in particular relative to the lower frame portion 18a,
- a drive motor for the linear movement of the lower tool carrier 20, in particular relative to the lower frame portion 18a,
- a drive motor for the linear movement of the lower tool 15, in particular relative to the lower tool carrier 20,
- a drive motor for the adjustability of the lower tool carrier 20 in the vertical direction Z, in particular relative to the frame 18,
- a drive motor for the linear movement of the upper tool carrier 21, in particular relative to the upper frame portion 18d, a drive motor for the linear movement of the lower frame portion 18a or the frame 18, in particular relative to the substrate 17, a drive motor for the linear movement of the automatic tool changer 22, in particular relative to the frame 18.

It may be noted that the service platform 16 is, in this instance, permanently fixed to the frame 18, in particular the left frame portion 18b, in the longitudinal direction X, the transverse direction Y and the vertical direction Z, that is to say, not displaceable. In principle, however, it is also conceivable to configure the service platform 16 to be displaceable in one or more of the directions X, Y, Z. However, the above-described service operations can then be carried out only both on the upper tool 13 and on the lower tool 15 from the service platform 16 if it is located in the service plane $E_2$.

According to another embodiment, a method for processing an aircraft structural component 2 having a processing installation 1 is provided.

In various embodiments, for maintenance, repair or a tool change, the upper tool 13 and the lower tool 15 can each be displaced into one or more service positions, in which both the upper tool 13 and the lower tool 15 are accessible from the service platform 16 for the service operators and/or a service device, such as an automatic tool changer 22. Service operations can thereby be substantially simplified and shortened.

The invention claimed is:

1. A processing installation for aircraft structural components having a processing station comprising a clamping frame for receiving an aircraft structural component which is intended to be processed in each case; wherein the clamping frame extends along a longitudinal axis of the processing station which extends in a longitudinal direction and a processing unit for processing the aircraft structural component which has an upper tool unit having an upper tool which is orientated along a first tool axis and a lower tool unit having a lower tool which is orientated along a second tool axis, wherein the first tool axis and the second tool axis extend parallel with a vertical direction which is angled relative to the longitudinal direction, wherein the processing installation has a processing region for processing the aircraft structural component which is formed by a laterally delimited, first spatial portion in which the clamping frame and the processing unit are arranged during processing, wherein the processing installation has a service region for carrying out service operations, which is formed by a laterally delimited, second spatial portion, wherein the first spatial portion is separated from the second spatial portion in a transverse direction which is orthogonal to the longitudinal direction and the vertical direction, wherein a service platform is arranged in the service region and is or can be positioned in a service plane which is orthogonal to the vertical direction, wherein the processing installation comprises a frame movable relative to a substrate and configured to carry the upper tool unit, the lower tool unit, and the service platform, wherein the upper tool and the lower tool are displaceable into at least one service position, and wherein both of the upper and lower tools are accessible from the service platform which is positioned in the service plane in the at least one service position.

2. The processing installation as claimed in claim 1, wherein the upper tool and/or the lower tool is/are positioned in the at least one service position in the processing region and/or in the service region.

3. The processing installation as claimed in claim 1, wherein the upper tool in the at least one service position in the service region, or in the transverse direction is positioned adjacent to the service region or the service platform in a plane, wherein the plane is orthogonal to the vertical direction and the plane is spaced apart from the service platform.

4. The processing installation as claimed in claim 3, wherein the spacing between the upper tool and the service plane is in a range from 0.5 m to 2.0 m.

5. The processing installation as claimed in claim 1, wherein the lower tool in the at least one service position in the transverse direction is positioned adjacent to the service region or the service platform, or the at least one service position is in the service region.

6. The processing installation as claimed in claim 1, wherein the lower tool is displaceable between different service positions along the service region and/or along the service platform.

7. The processing installation as claimed in claim 6, wherein the lower tool carrier is rotatable and/or linearly displaceable relative to the service region.

8. The processing installation as claimed in claim 1, wherein the lower tool in the at least one service position in the transverse direction is positioned adjacent to an automatic tool changer.

9. The processing installation as claimed in claim 8, wherein the automatic tool changer is positioned in a park position of the automatic tool changer in the service region and/or is positioned in a change position of the automatic tool changer in the transverse direction adjacent to the service region and/or in a vertical direction above the lower tool carrier.

10. The processing installation as claimed in claim 1, wherein the upper tool in the at least one service position in the vertical direction is positioned above a test portion holder.

11. The processing installation as claimed in claim 10, wherein the test portion holder in the transverse direction is positioned adjacent to the service region and/or the service platform.

12. The processing installation as claimed in claim 1, wherein the lower tool in the at least one service position in the vertical direction is positioned below a test portion holder.

13. The processing installation as claimed in claim 1, wherein the processing installation has a frame, on which the upper tool is supported.

14. The processing installation as claimed in claim 13, wherein the frame has at least one lateral frame portion, wherein the first spatial portion which forms the processing region is laterally delimited by the at least one lateral frame portion.

15. The processing installation as claimed in claim 14, wherein the service platform is arranged at or adjacent to the at least one lateral frame portion, wherein the upper tool and/or the lower tool is/are accessible past the lateral frame portion or through an opening which is directed in a traverse direction in the lateral frame portion in the respective service position from the service platform, or is/are displaceable between the processing region and the service region.

16. The processing installation as claimed in claim 14, wherein the at least one lateral frame portion is connected to an upper frame portion for supporting the upper tool and/or a lower frame portion for supporting the lower tool, wherein the lower frame portion, the at least one lateral frame portion and the upper frame portion together form a C-shape or portal-like shape.

17. The processing installation as claimed in claim 13, wherein the service platform is permanently fixed on the frame, in the longitudinal direction and/or transverse direction and/or vertical direction.

18. The processing installation as claimed in claim 1, wherein the processing installation has a frame, on which the upper tool and the lower tool are supported.

19. The processing installation as claimed in claim 18, wherein the upper tool and/or the lower tool can each be displaced relative to the frame between at least one processing position and at least one service position.

20. A processing installation for aircraft structural components having a processing station comprising a clamping frame for receiving an aircraft structural component which is intended to be processed in each case; wherein the clamping frame extends along a longitudinal axis of the processing station which extends in a longitudinal direction and a processing unit for processing the aircraft structural component which has an upper tool unit having an upper tool which is orientated along a first tool axis and a lower tool unit having a lower tool which is orientated along a second tool axis, wherein the first tool axis and the second tool axis extend parallel with a vertical direction which is angled relative to the longitudinal direction, wherein the processing installation has a processing region for processing the aircraft structural component which is formed by a laterally delimited, first spatial portion in which the clamping frame and the processing unit are arranged during processing, wherein the processing installation has a service region for carrying out service operations, which is formed by a laterally delimited, second spatial portion, wherein the first spatial portion is separated from the second spatial portion in a transverse direction which is orthogonal to the longitudinal direction and the vertical direction, wherein a service platform is arranged in the service region and is or can be positioned in a service plane which is orthogonal to the vertical direction, wherein the upper tool and the lower tool are displaceable along the longitudinal axis into at least one service position, wherein both the upper and lower tools are accessible from the service platform which is positioned in the service plane in the at least one service position, wherein the processing installation has a frame, on which the upper tool and the lower tool are supported, and wherein the upper tool and/or the lower tool can each be displaced relative to the frame between at least one processing position and at least one service position.

\* \* \* \* \*